May 14, 1963 O. HOFFMANN 3,089,188
APPARATUS FOR COMPRESSING ARTICLES
Filed May 11, 1959 3 Sheets-Sheet 2
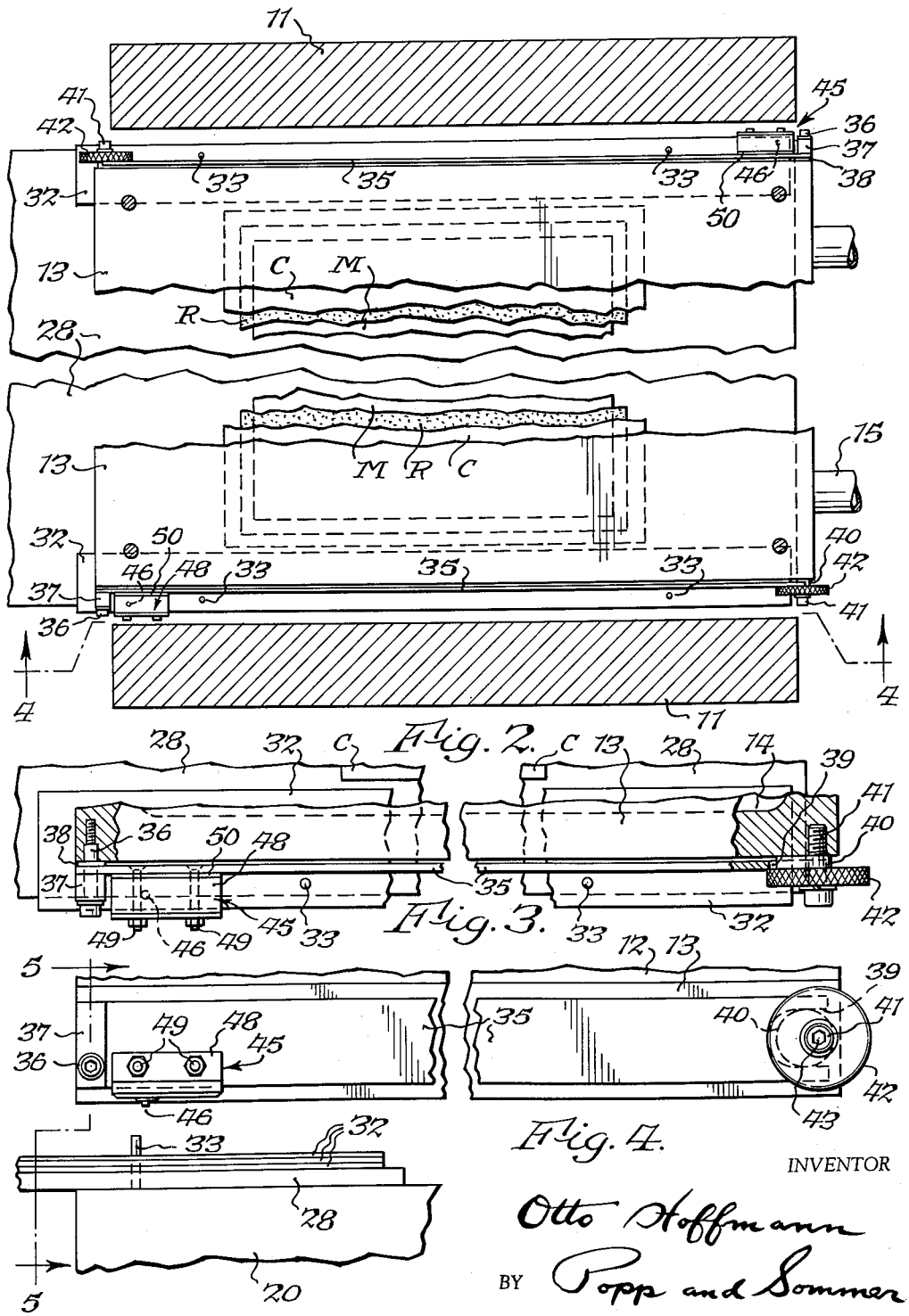
INVENTOR
Otto Hoffmann
BY Popp and Sommer
ATTORNEYS

United States Patent Office 3,089,188
Patented May 14, 1963

3,089,188
APPARATUS FOR COMPRESSING ARTICLES
Otto Hoffmann, Kenmore, N.Y., assignor, by mesne assignments, to Lake Erie Machinery Co., Philadelphia, Pa., a corporation of Pennsylvania
Filed May 11, 1959, Ser. No. 812,311
5 Claims. (Cl. 18—16)

This invention relates to apparatus for automatically pressing articles to an exact dimension in the direction of the applied pressure and more particularly to molding such articles which must be uniform in said dimension over a large area and which are required to be held under full or reduced pressure for an extended time during the molding thereof.

While the invention is not to be construed as limited to any particular use or product, the invention has particular utility in producing plastic matrices and rubber plates for printing where the effective thickness must not only be held within very close limits during the molding thereof but an exact thickness must be held throughout the area of the mat or plate being molded. Without such exactness in molding, good printing is impossible since a differential in printing impression will follow from a variation in effective thickness regardless of whether the variation is localized or whether it is over a large area, such as the plate being wedge-shaped or having a high or low center.

It is accordingly the principal object of the invention to provide apparatus for automatically pressing a workpiece to produce an article of exact dimension in the direction of the applied pressure and which will maintain such exactness over the full area of the article being pressed.

Another object is to provide such apparatus which is applicable to articles requiring both heat and pressure, such as with printing plates and mats where the molding pressure is frequently from 200 to 500 and more p.s.i.

Another object is to provide such apparatus which is equally applicable to a wide variety of materials, such as materials which expand and contract or "breathe" while being cured, materials which require a long curing or vulcanization time, materials which either rapidly or slowly "die" or change to a stable form but are required to be held for a curing period, materials which require widely different molding pressures, and compound materials where such characteristics may be present in different proportions.

Another object is to provide such apparatus which only requires approximate knowledge of the critical time of set up of the material being processed and eliminates the requirement for exact knowledge of all other factors, such as the total area of the workpiece; the thickness of the material used and of the product; the surface design of the original, that is, whether the material can flow freely as with greater throat thickness and areas or less freely as with solid half tones; or the flow characteristics of the material being processed, some materials flowing more freely than others under the same molding conditions. An exact knowledge of these other factors is an important part of the art of an experienced and skilled operator in producing printing plates and mats.

Another object is to provide such apparatus which, by the use of suitable gages on the press, can be used to determine the effect of the above and comparable factors for a particular material or operation.

Another object is to provide such apparatus by which the articles are formed with proper minimum pressure, that is, at any one time the applied pressure is only that required to deform the workpiece or to hold it in desired shape. The required pressure varies widely, of course, during the transition of the material from a solid state to a soft or moldable state during the pressing operation, as well as during transition to final relatively stable form during and after the curing operation.

Another object is to eliminate the necessity of predetermination or estimation of the required molding pressure and the present practiced necessity of manually checking for adequate molding pressure by tapping the bearers or side irons to make sure they are tightly held under pressure.

Another most important object is to provide such apparatus which will avoid detrimental deformation of the press platens, either temporarily or permanently. Such platen deformation, caused by excessive pressures used in empirical practice, is accountable for a large proportion of imperfect printing plates particularly where the mats or plates have raised or depressed centers which is often caused by actual bending of the platens under excessive molding pressure.

Other objects and advantages of the invention will be apparent from the following description and drawings in which:

FIG. 2 is a horizontal section, on an enlarged scale, taken generally on line 2—2, FIG. 1, parts being broken away.

FIG. 3 is a fragmentary view similar to FIG. 2 on an enlarged scale.

FIG. 4 is a fragmentary vertical elevational view, on an enlarged scale, taken generally on line 4—4, FIG. 2.

Figure 1:
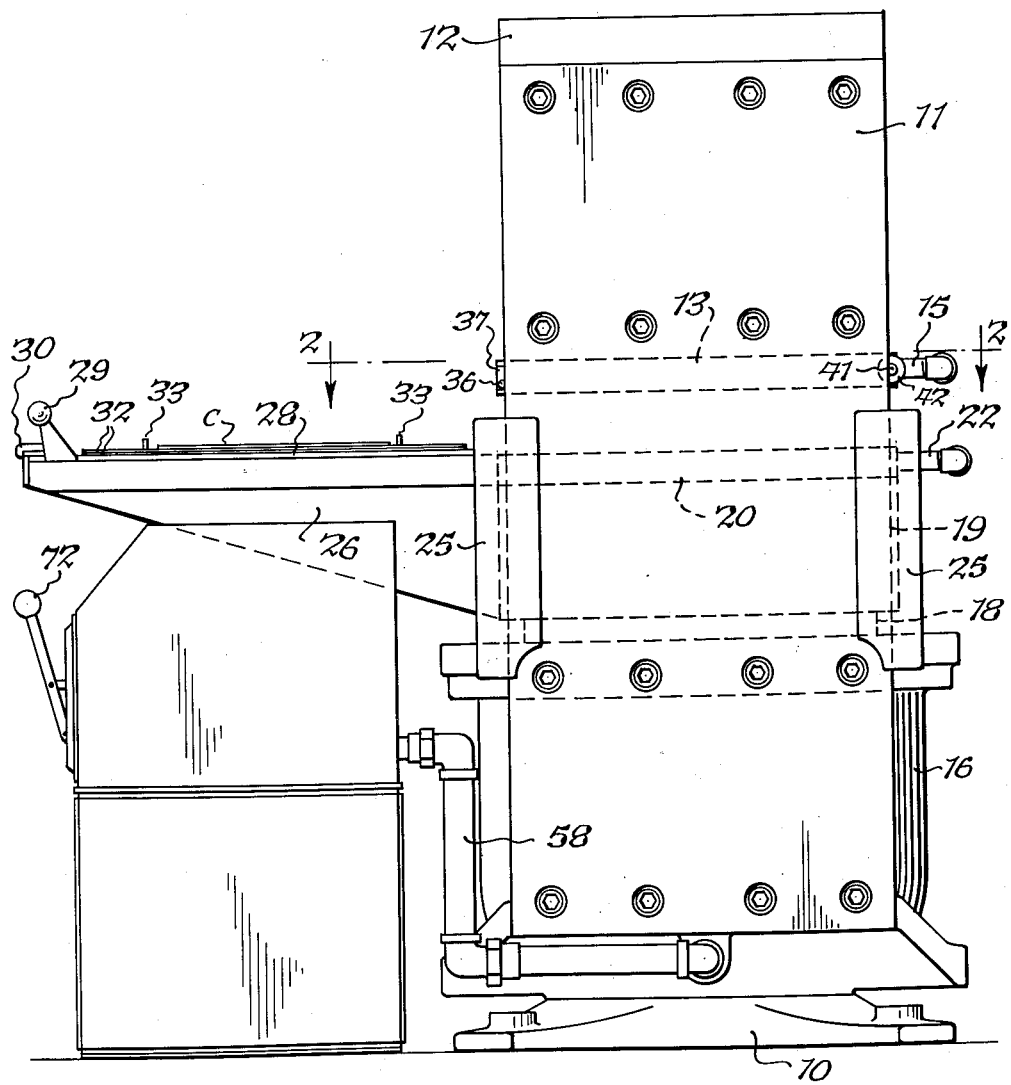
FIG. 1 is a side elevational view of a molding press embodying and adapted to carry out the present invention.
Figure 5:
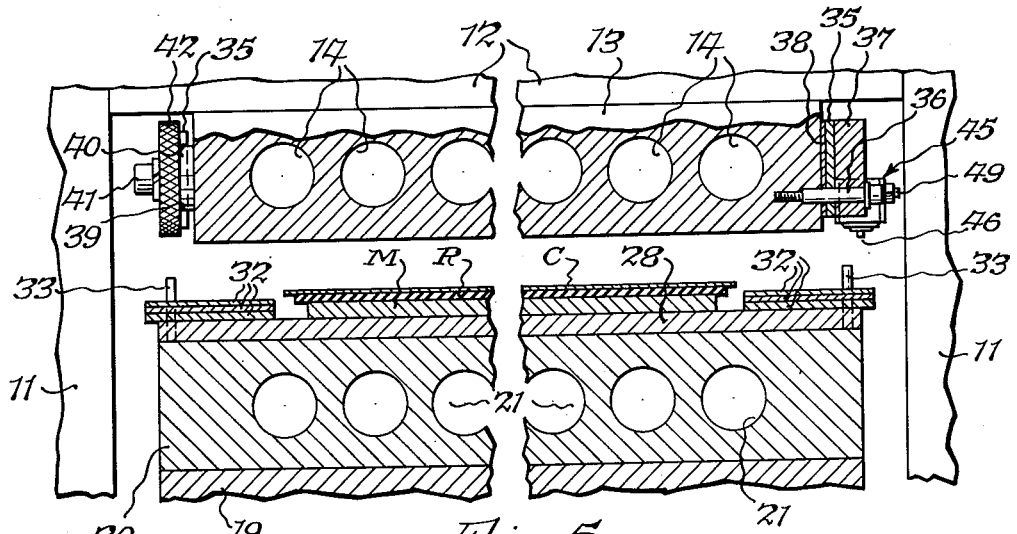
FIG. 5 is a fragmentary vertical section taken generally on line 5—5, FIG. 4.

Although the invention can be practiced in molding or pressing, with or without curing or vulcanization, many kinds of moldable workpieces to exact thickness, especially where it is desirable to use minimum molding pressures throughout the cycle and where uniformity in dimension of the product in the direction of the applied pressure, over a broad area, is required, the invention is illustrated in conjunction with a press for producing a plastic mat or matrix with a semi-finished sheet of thermosetting material from a type form, electrotype or a zinc or other original, or for producing a rubber or synthetic plastic printing plate from such a matrix. For the purposes of illustration, it will be assumed that a rubber printing plate is to be produced from a plastic matrix.

The press to which the control of the present invention is applied is shown as being of conventional construction having a base 10 carrying a pair of side plates 11 supporting between them an upper fixed platen 12 to the underside of which is secured a fixed heated plate 13. This fixed heated plate 13 is shown as bored to provide an internal passage 14 supplied with steam from a steam line 15. Electrical or hot oil heating could, of course, be used.

Between the side plates 11, the base carries a vertical main cylinder 16 the upper end of which is open and carries a vertically moving main ram 18. This ram supports the moving platen 19 on which is mounted a moving heated plate 20. As with the fixed heated plate 13, the moving heated plate 20 is bored to provide a steam passage 21 supplied with steam from a steam line 22, although it could be heated otherwise. Each of the heated plates 13, 20 is preferably of flat, rectangular form and is supplied with steam from the corresponding steam pipe 15 or 22, the steam being supplied to both heated plates at such pressure as to maintain the platens at the proper temperature for vulcanizing or setting the particular material being pressed.

The ram 18 is guided by the usual corner guides 25 on the side plates 11 and these side plates also support a front table extension 26, the upper surface of which is in line with the top surface of the heated plate 20 at all times, that is, it is secured to and rises and lowers with the moving platen 19.

This table supports a rolling plate 28 which is slidable fore-and-aft from the top of the front table 26 onto the top of the movable heated plate 20 and vice versa by means of handles 29 secured to the front corners of the sliding plate. A suitable manually releasable latch 30 is provided at the front of the table extension 26 for holding the rolling plate in its fully withdrawn position on the table 26.

In the conventional use of the press as above described, such conventional presses not having the hereinafter described locating pins 33 and other features however, it will be assumed that a finished rubber printing plate is to be produced from a thermosetting plastic matrix or mat M. This matrix can have been previously made on the press from the original zinc, electrotype or type form (not shown). This matrix M is laid, back down, upon the rolling plate 28 which at this time has been pulled out on the table 26 for easy loading and held in place by the latch 30 at the front end of the table.

Side irons or bearers 32 in two groups each totalling the proper thickness are then selected. These side irons or bearers are each in the form of long, flat metal strips of predetermined thickness which are piled up in two groups of equal height or thickness. These bearers are arranged to have their ends project from between the heated plates 13 and 20 at the front of the press. The selection of the side irons or bearers 32 of the proper thickness is most important and is determined by adding the matrix floor of the matrix M to the desired plate thickness, an additional allowance being made for the thickness of the holland cloth or other cover sheet subsequently used, if this holland cloth is not placed over the side irons or bearers in addition to the workpiece. The matrix floor is the distance from the face or printing surface of the type form or original (as reproduced as the bottoms of the impressions in the matrix) to the back of the matrix. An additional thickness should be provided to compensate for the changes in dimensions of the materials between the hot and cold state. These side irons or groups of bearers of the proper equal thickness are then placed on opposite sides of the rolling plate 28 along the side margins of the latter and in position to have their ends protrude toward the operator from between the heated plates 13 and 20.

A sheet of unvulcanized rubber R is then cut just enough substantially to completely cover the printing area of the matrix M. The type of vulcanizable rubber or gum used is determined by the nature of the type form or original (not shown), the surface to be printed, the kind of ink to be used and the length of the press run. This cut piece of rubber, after brushing off any excess dust and the removal of any holland cloth backing, is then placed over the printing area of the matrix M on the rolling plate 28. Other fill-in pieces are then placed on the rubber sheet where more rubber volume is required depending upon the matrix design or copy. A piece of holland cloth or other cover sheet C is then placed over the sheet of rubber R. In conventional practice, this piece of holland cloth C or other cover sheet extends over the two side irons or groups of bearers 32. The holland cloth does not cover the bearers, its thickness must be added to the height or thickness of each group of bearers to compensate for the extra thickness provided by the cloth.

The catch 30 is then released and the sliding plate, so loaded, is slid into the press on top of the lower heated plate 20. The operator then admits fluid under pressure into the cylinder 16 to move the main ram, movable platen 19 and heated plate 20 upwardly, the press being closed and pressure gradually applied until the side irons or groups of bearers 32 are engaged as determined by tapping their ends projecting from between the heated plates. Pressure against these side irons is maintained until the vulcanization is complete when the press is opened and the finished rubber printing plate removed.

Figure 7:
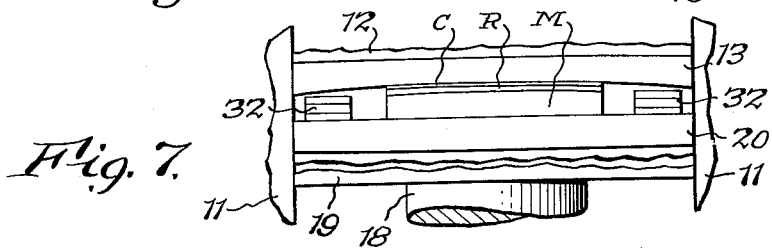
FIG. 7 is a diagrammatic representation illustrating one form of platen distortion resulting from conventional practice with the use of excessive molding pressures.
Figure 8:
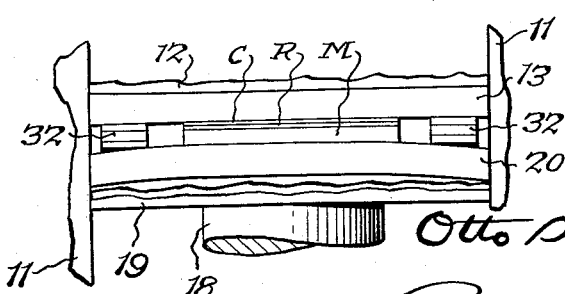
FIG. 8 is a view similar to FIG. 7 showing another form of platen distortion.

The ultimate press pressure utilized depends upon the materials, that is, the natural or synthetic rubber or plastic used, as well as the speed of pressure build up in molding, area, depth, design and other conditions. The selected pressure depends upon the skill and experience of the operator as well as his knowledge concerning the particular materials being used. As to the matter of press pressure, the usual practice is to be sure that there is enough pressure to perform the operation with the result that excessive pressures are the rule rather than the exception. Thus excessive pressures, especially when combined with too rapid pressure build up, is initially impressed exclusively on the workpiece and is apt to crush or distort the type face of the original from which the plastic matrix is being made, or damage the plastic matrix from which the rubber printing plate is being made. Continued excessive pressure results in an attempt of the press to engage the side irons or bearers 32 before the workpiece has softened to an extent to permit this to be done without excessive resistance. When this occurs the upper fixed platen 12 arches or curves upwardly at its center in an attempt, as shown in FIG. 7, to establish mutual contact with the bearers before the workpiece has softened sufficiently. Thus the sides of this upper platen are fixed to the side plates 11 and excessive pressure from the moving platen though the workpiece causes the upper platen to arch upwardly and if the workpiece should set up under such conditions, as could occur with a too slow press closing rate, the rubber plate R would be high or thick at its center and hence imperfect. When the workpiece softens, it no longer offers resistance and the whole platen pressure is borne by the side irons or bearers 32. If excessive press pressure exists at this time, as shown in FIG. 8, while the upper platen 12 is straight or flat, because the pressure from the bearers 32 is applied close to its attachment to the side plates 11, the downward pressure of the bearers bends downwardly the side portions of the lower platen 19 beyond the ram 18 so that the resulting rubber plate R has a thin center and is hence imperfect.

In the practice of the present invention the proper rate of pressure build up is preset in the conventional manner and the movement of the press otherwise controlled, as later discussed in detail, to provide proper minimum pressure application at all stages of the cycle and avoid the condition shown in FIG. 7 or the condition show in FIG. 8. To accomplish this, in combination with such preset rate of pressure build-up, the press of the present invention is preferably constructed and operates as follows:

The bearers 32 are provided with holes at their front and rear ends which are arranged to register with one another so that groups of bearers can be placed over locating pins 33 provided in pairs at the opposite side margins of the rolling plate 28. Adjusting arms 35 are arranged along opposite sides of the upper heating plate 13 in line with these side irons or bearers and directly above these bearers when the sliding plate 25 is between the platens. Each of these arms 35 is pivoted by means of a horizontal pivot pin 36 to the corresponding side of the heating plate 13 at one corner thereof, one arm 35 being pivoted near the front corner and the other arm 35 being pivoted near the rear corner of the upper heating plate. The arms 35 at their pivoted ends are reinforced by a block 37 integral with the arms 35 to provide a long and close fitting bearing. Preferably, heat insulating washers 38 are interposed at each pivot between the heating plate 13 and each arm 35 to reduce heat transfer. The opposite end of each arm 35 is bifurcated to provide an end jaw 39, these end jaws being arranged adjacent the other corners of the heated plate 13. These jaws 39 each closely embrace the top and bottom of a circular cam 40 journalled eccentrically on a screw 41 and fast to a knurled adjusting wheel 42. The head of the screw 41 is recessed, as indicated at 43, to receive a suitable wrench or screw driver and when loosened permits the knurled wheel 42 and its cam 40 to be turned so that the corresponding end of the companion arm 35 can be adjusted vertically.

The pivoted end of each arm carries a sensing device for detecting relative movement of the heated plates. While this could be in the form of hydraulic or electronic sensing devices of many different forms, it is shown as being in the form of a microswitch 45 which has its sensor operating port or button 46 projecting downwardly to engage the top of the corresponding side iron or group of bearers 32. The casing 48 of the microswitch is shown as secured to the outside face of each arm 35 by means of bolts 49 and is faced with mica insulating panels 50 to protect the switch from excessive heat. These microswitches normally open and close in response to a very small inward and outward movement of their sensors operating parts or buttons 46; the microswitches actually employed operate on a differential movement of approximately .0003 inch. It will be seen that these microswitches are subject to very fine adjustment since they are at the pivoted ends of the relatively long arms 35 the free ends of which are cam adjusted.

Figure 6:
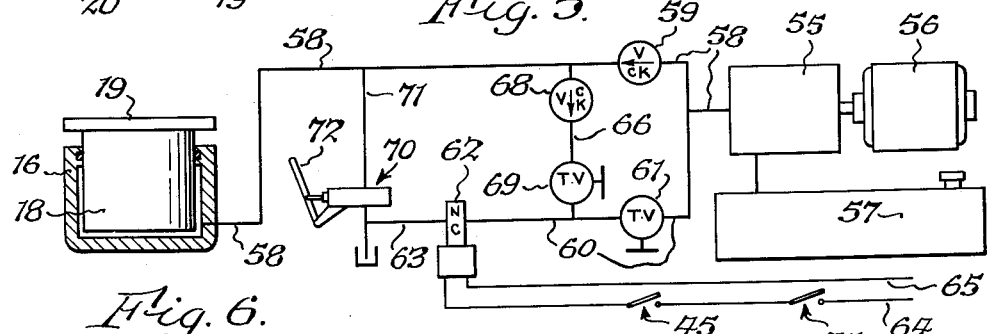
FIG. 6 is a simplified diagram of the hydraulic and electrical circuit of the press.

Referring to FIG. 6, the numeral 55 represents a double pump and combination valve unit driven by an electric motor 56 and having a high volume stage operable to deliver from a tank 57 a large volume of oil at low pressure, and having a low volume, high pressure stage which continues to operate after unloading of the high volume stage to provide a reduced rate of pressure application, which in turn can be adjusted downward at will to suit the characteristics of the work being handled. This oil is delivered through a line 58 past a check valve 59 to the cylinder for the main ram 18 and it will therefore be seen that the high volume stage of the pump 55 delivers a large volume of oil to the main ram cylinder to rapidly bring the heated plates 13, 20 to the workpiece following which the low volume high pressure stage of the pump reduces its delivery to a preset value to provide the rate of pressing movement of the moving platen best suited to the particular workpiece being processed. The check valve 59 opens toward the main ram cylinder to permit this flow but to prevent return flow.

The numeral 60 represents a branch line of the pump outlet, in advance of the check valve 59, having a throttle valve 61 containing a manually adjustable restriction, this valve being used to divert the delivery of the low volume stage of the double pump and combination valve unit 55 to exhaust when the required holding pressure of the ram has been reached. Beyond this throttle valve 61 the line 60 has a normally closed valve 62 shown as a solenoid valve although with hydraulic sensing devices, a hydraulically controlled valve would, of course, be used. The outlet line 63 from this normally closed solenoid valve discharges to any suitable exhaust or drain, as back to tank 57, and the winding of this solenoid valve is in series with the two microswitches 45, these being shown in one side of the line 64, the other side of this line being indicated at 65.

A branch line 66, containing a check valve 68 and a manual throttle valve 69, connects the main ram cylinder end of the main pump line 58 with the branch line 60 between the throttle valve 61 containing the manually adjustable restriction and the normally closed solenoid valve 62. The check valve 68 opens toward the branch line 60. The simplified circuit illustrated in FIG. 6 is shown as completed by an on and off valve 70 in a line 71 connecting the main ram cylinder side of the main pump line 60 to exhaust or tank. This valve is shown as a hand valve, having a handle 72 movable to open and closed positions.

With a press equipped with such a control embodying the present invention the operator preadjusts the steam pressure from lines 15 and 22 to provide the correct temperature of the heated plates 13 and 20 for the proper vulcanization of the particular rubber sheet R being processed. Side irons or bearers 32 in two groups each totalling the proper thickness are then selected as previously described, and are strung on the pins 33 projecting upwardly from the edges of the sliding plate 28, so that these groups of bearers are along the side margins of this sliding plate, preferably to project outwardly therefrom as shown.

The operator then adjusts the valve 61 containing a manually adjustable orifice to provide such holding pressure against the side irons or bearers 32 as is desirable to insure full surface contact of these bearers with one another and with the heated plates. Assuming that 100 p.s.i. line pressure is desirable for this purpose, this can be done by closing the hand valve 70 so as to divert the output of the double pump and combined valve unit 55 into the main cylinder 16. The high volume stage of this double pump and combination valve unit 55 moves the ram 19 to contact the heated plates 13, 20 with the side irons or bearers following which the low volume high pressure stage takes over to build up, through line 58, the ram pressure to the desired value of, say, the assumed 100 p.s.i.

With such closing of the heated plates 13, 20 against the bearers 32, both microswitches 45 are closed thereby to energize the solenoid valve 62 and open the line 60 to exhaust. If the line pressure to the main cylinder exceeds this assumed value of 100 p.s.i., the operator opens the valve 61 containing the adjustable restriction until the line pressure drops to and steadies at this assumed value, the full output from the high pressure stage of the double pump and combination valve unit escaping through this valve 61 and open solenoid valve 62 to exhaust, but the adjustable restriction of the valve 61 providing the desired back pressure of the assumed 100 p.s.i. The adjustment of this valve 61 is not particularly critical since if its adjustment should result in a holding line pressure of as little as, say, 75 p.s.i., the bearers 32 would still be held in firm contact with one another and with their heated plates 13, 20. After such adjustment of the valve 61, the hand valve 70 is opened, this allowing the main ram 18 to return to its open position. This is a preliminary setting that does not have to be repeated for each operation of the press.

The sliding plate 28, on the table extension 26 is then loaded, between the bearers 32, successively with the thermosetting plastic matrix M, face up, sheet R of unvulcanized rubber, and piece of holland cloth C or other cover sheet as above described. The operator also adjusts the controls to supply oil at a preset rate from the low volume high pressure stage of the double pump and combined valve unit 55, this preset rate being determined by the critical time of set up of the material being processed.

The operator now releases the catch 30 at the front end of the table extension 26 and pushes the rolling plate 28 into the press on top of the heated plate 20 carried by the lower movable platen 19. He then throws the valve handle 72 of valve 70 from open to closed position thereby to cut off from exhaust both the main cylinder 16 and the output from the double pump and combination valve unit 55.

Closing the valve 70 causes the full output from the high volume stage of the double pump and combination valve unit 55 to be delivered through the line 58 past the check valve 59 to the cylinder 16 for the main ram 18. Accordingly the ram 18 brings the workpiece to the heated plate of the upper platen. Engaging the workpiece results in the pump back pressure exceeding a predetermined value thereby unloading the high volume stage of the double pump and combination valve unit 55; the remaining effective low volume stage results in a reduced rate of pressure application which in turn can be adjusted downwardly at will for each job. This adjustably reduced speed, adjustable to suit the critical time of set up of the material being worked, avoids premature or excessive pressures on the workpiece which could result in imperfect work and possible platen distortion.

The softening of the rubber plate R is therefore accompanied by the slow upward closing movement of the ram 18 which presses the rubber into the type face of the matrix M. This slow raising movement of the ram 18 continues until the side iron or group of bearers 32 at one side of the press engages and closes the corresponding normally open microswitch 45.

Since this closed microswitch 45 is in series with the companion open microswitch 45 nothing in the electrical circuit is actuated and the ram 18 continues its slow upwardly closing movement, but since the progress is blocked at one side by the engaged side iron or bearers 32, the ram moves to positively aline the platens in such continued closing movement of the press. This positive platen alining movement of the press continues until the bearers 32 at the other side of the press are engaged, this closing the remaining open microswitch 45 so that both microswitches are closed.

The closing of both microswitches 45 energizes and opens the normally closed solenoid valve 62. This opening of the solenoid valve 62 diverts the output of the double pump and combination valve unit 55 to exhaust through the branch 60 past the throttle valve 61 containing the adjusted restriction. However, since the adjustable restriction of this valve 61 has been set to maintain a line pressure of the assumed 100 p.s.i., the line pressure from the low volume high pressure stage of the pump does not drop below this value and this holding pressure is maintained on the bearers 32 to hold them in full surface contact with one another and with the heated plates 13, 20. This opening of the solenoid valve 62 also decompresses or relieves any pressure in excess of this assumed 100 p.s.i. line pressure in the main cylinder 16, the oil in this cylinder escaping to exhaust through the lines 58, 66, 60 and 63 past the check valve 68, manually adjusted throttle valve 69 and open solenoid valve 62. Accordingly, the main ram 18 is held in pressure contact with the bearers 32 at the assumed minimum pressure of 100 p.s.i. and the platen pressure cannot rise to the high level (now customarily used to assure bearer tightness) which high level of pressure could distort the platens in the manner shown in FIG. 8.

Particularly in the assumed production of rubber printing plates, it has been found that some materials expand during curing or vulcanization, which, unless controlled, would not only result in a thicker product than required but could also result in a product lacking uniformity in thickness since in pushing apart the platens there would be no assurance that they would remain parallel. With the present invention this expansion of the material is counteracted to not only insure that the thickness of the product is held to within the movement of the microswitches 45 but also that this thickness is maintained uniformly through the product.

Thus, assume that the rubber plate R expands uniformly or on one side so as to spread apart the heated plates 13, 20 at one or both sides of the press. As soon as this movement exceeds .0003 inch the corresponding microswitch or microswitches 45 open to open the circuit through the normally closed solenoid valve 62. This cuts off both the main cylinder and the pump discharge from exhaust and accordingly the low volume high pressure output from the double pump and combined valve unit 55 passes the check valve 59 and builds up pressure in the main cylinder 16. When a sufficient value is reached, this pressure forces the rubber plate R back to the predetermined thickness. Following this the open microswitch or microswitches 45 are engaged and closed by the corresponding bearers 32. This re-establishes a circuit through the two microswitches 45 and the normally closed solenoid valve 62 to reopen this valve. Accordingly the main cylinder 16 and the output from the double pump and combination valve unit 55 are reopened to exhaust, the latter through the valve 61 containing the manually adjusted restriction to maintain the assumed 100 p.s.i. line pressure. The line pressure therefore drops to this value which is maintained unless the workpiece expands again to repeat the cycle of closing the system to exhaust and forcing the workpiece back to the predetermined thickness. In practice, with materials that expand on curing or vulcanization, at least one microswitch 45 and the solenoid valve 62 may open and close many times before curing or vulcanization is completed.

While for simplicity of explanation this action with a workpiece that expands on curing has been described as an alternate movement of oil under pressure into and from the main cylinder, it will be understood, the total movement of the ram and the actual transfer of oil is extremely slight and the microswitches 45 act more to maintain the platens a fixed distance apart as determined by the bearers 32. The molding of plastic mats and rubber plates for printing generally requires from five to ten minutes to soften and then cure the material.

At the prescribed end of the curing time, the on and off hand valve 70 is opened so that both the main cylinder 16 and the output of the double pump and combined valve unit 55 are opened fully to exhaust so that the main ram 18 rapidly lowers. The operator then pulls out the sliding plate 28 by means of the handles 29, strips off the finished rubber plate R and repeats the operation with a cool matrix.

It will particularly be noted that the only pressure applied to the bearers 32 is that low value found desirable to insure full contact of the bearers with one another and with the heated plates 13, 20 between which they are placed plus such pressure as may be required to bring the platens into parallelism if they are out of alinement. Accordingly, with proper adjustment of the valve 61 and the rate of input to the main cylinder there can be no undesirable platen distortion, crushing of the face of the original or matrix being reproduced, or excessive pressure upon the bearers 32 at any time because the position of ram, following softening of the material being formed, is determined essentially by the two microswitches 45. As previously indicated, even with correct rate of input to the main cylinder for softening and forming the material, it is the usual practice for the operator to provide more than enough ram pressure against his bearers 32 to avoid any possibility of insufficient pressure rendering the bearers inoperative as gages. This use of excessive pressures is particularly prevalent because of the crude way of testing for proper ram pressure against the bearers, namely, by closing the press against the bearers only and then tapping the projecting ends of the bearers to ascertain that they are tight.

It will also be seen that in effect the thickness of the matrix or plate being produced is accurately gaged to within .0003 inch from all four corners of the press. Thus the closing movement of the movable platen, regardless of misalinement in any direction, is stopped by either end of either group of bearers which it engages but the total movement of the movable platen is only stopped when the last microswitch 45 is closed. Accordingly regardless of how the platens may be misalined, they are brought into parallelism at all four corners before the movable platen is stopped, and are held in such parallelism during the entire curing operation, so that the printing plate or matrix must also be parallel sided and of uniform thickness throughout. This is in contrast to the present practice of tapping the projecting ends of the groups of bearers, where tapping the front ends of the bearers would not shown looseness at the rear end of either in which event the pressure applied would not be sufficient to produce a product of uniform thickness. It is because of such inconclusiveness in testing for proper pressure by tapping bearers that it is the rule to use excessive pressures with resultant platen distortion and loss of uniform thickness in the product and it is not surprising that such excessive pressures have been used as to permanently distort the platens and require redressing thereof.

It will be understood that equivalent components could be used for those specifically described, such as hydraulic or electronic sensing devices for the electrical microswitches shown and described, and the invention is not limited to the particular type of components described in detail but is to be accorded the full range of equivalents comprehended by the following claims.

It will accordingly be seen that the present invention achieves the objectives and insures a high quality product in such articles as printing plates or matrices without requiring such full knowledge of the characteristics of the particular material being used and the skill of the trade as has heretofore characterized this work.

I claim:
1. In a molding press having a main cylinder, a ram in said main cylinder, a movable platen carried by said ram, a fixed platen arranged in opposed relation to said movable platen, and a pump having an outlet for supplying fluid under pressure to said main cylinder; the combination therewith of means for molding a workpiece to an exact thickness, comprising a first fluid line connecting said main cylinder with said pump outlet, a check valve in said first line opening toward said main cylinder, an on-off valve having one side connected with said first line between said check valve and main cylinder and having its other side connected to discharge fluid from said first line to exhaust, a second fluid line connecting said pump outlet with exhaust, a control valve in said second line, a branch line connecting said first line, between said check valve and main cylinder, with said second line, between said pump outlet and control valve, a check valve in said branch line and opening toward said second line, and means responsive to the closing movement of said platens to open said control valve and responsive to the opening movement of said platens to close said control valve including a pair of microswitches connected in series with each other and with said control valve and operatively interposed between different parts of said platens.

2. In a molding press having a movable platen movable toward and from a fixed platen, and press closing and opening means moving said movable platen toward and from said fixed platen; the combination therewith of means bringing said platens on closing substantially into parallelism to mold a workpiece to substantially exact thickness throughout its area along the opposing faces of said platens, comprising a gage member mounted on each of two sides, transversely of the line of movement of said platens, of one of said platens to move therewith relative to the other platen and in position to be clamped between and to stop the movement of said platens toward each other at each of said sides, a microswitch mounted on one of said platens at each of said sides thereof to move with its platen relative to the other platen and each positioned to be actuated in response to the movement of said platens toward and from each other before clamping engagement and disengagement of the companion gage member, and means arranged in series with both of said microswitches and responsive to the actuation thereof and actuating said press closing and opening means to arrest the movement of said platens toward each other when both of said microswitches are actuated in response to the movement of said platens toward each other, whereby when only one of said microswitches and its gage member is engaged by the movement of said platens toward each other, said platens fulcrum about said last mentioned gage member until the microswitch on the other side of said platens is engaged and actuated at which time said platens are substantially parallel with each other.

3. In a molding press having a movable platen movable toward and from a fixed platen, and press closing and opening means moving said movable platen toward and from said fixed platen; the combination therewith of means bringing said platens on closing substantially into parallelism to mold a workpiece to substantially exact thickness throughout its area along the opposing faces of said platens, comprising a gage member mounted on each of two sides, transversely of the line of movement of said platens, of one of said platens to move therewith relative to the other platen and in position to be clamped between and to stop the movement of said platens toward each other at each of said sides, a sensing device mounted on one of said platens at each of said sides thereof to move with its platen relative to the other platen and having a sensor movable in the order of a few ten thousandths of an inch to actuate its sensing device and each sensor being positioned to be actuated by direct engagement with the corresponding gage member in response to the movement of said platens toward and from each other before clamping engagement and disengagement of the companion gage member, and means arranged in circuit with both of said sensing devices and responsive to the actuation of said sensors by said gage members and actuating said press closing and opening means to arrest the movement of said platens toward each other when both of said sensors are operated by direct contact with both of said gage members in response to the movement of said platens toward each other whereby when only one of said sensors and its gage member is engaged by the movement of said platens toward each other, said platens fulcrum about said last mentioned gage member until the sensing device on the other side of said platens is engaged and actuated at which time said platens are substantially parallel with each other.

4. In a mold press having a movable platen movable toward and from a fixed platen, and press closing and opening means moving said movable platen toward and from said fixed platen; the combination therewith of means bringing said platens on closing substantially into parallelism to mold a workpiece to substantially exact thickness throughout its area along the opposing faces of said platens, comprising a gage member mounted on each of two sides, transversely of the line of movement of said platens, of one of said platens to move therewith relative to the other platen and in position to be clamped between and to stop the movement of said platens toward each other at each of said sides, an arm pivotally connected at one end to one of said platens at each of said sides thereof to move with its platen relative to the other platen and each extending transversely of and swinging in the direction of relative movement of said platens, means interposed between the outer extremity of the free end of each arm and the platen carrying the arm and adjusting the angular position of each arm, a sensing device carried by each arm adjacent its pivoted end and each positioned to be actuated in response to the movement of said platens toward and from each other before clamping engagement and disengagement of the companion gage member, and means responsive to the actuation of said sensing devices and actuating said press closing and opening means to arrest the movement of said platens toward each other when both of said sensing devices are actuated in response to the movement of said platens toward each other whereby when only one of said sensing devices and its gage member is engaged by the movement of said platens toward each other, said platens fulcrum about said last mentioned gage member until the sensing device on the other side of said platens is engaged and actuated at which time said platens are substantially parallel with each other.

5. In a molding press having a main cylinder, a ram in said main cylinder, a movable platen carried by said ram, a fixed platen arranged in opposed relation to said movable platen, and a pump having an outlet for supplying pressure to said main cylinder; the combination therewith of means bringing said platens on closing substantially into parallelism to mold a workpiece to substantially exact thickness throughout its area along the opposing faces of said platens, comprising a gage member mounted on each of two sides, transversely of the line of movement of said platens, of one of said platens to move therewith relative to the other platen and in position to be clamped between and to stop the movement of said platens toward each other at each of said sides, a first fluid line connecting said main cylinder with said pump outlet, a check valve in said first line opening toward said main cylinder, an on-off valve having one side connected with said first line between said check valve and main cylinder and having its other side connected to discharge fluid from said first line to exhaust, a second fluid line connecting said pump outlet with exhaust, a control valve in said second line, a branch line connecting said first line, between said check valve and main cylinder, with said second line, between said pump outlet and control valve, a check valve in said branch line and opening toward said second line, and means responsive to the closing movement of said platens to open said control valve and responsive to the opening movement of said platens to close said control valve including a sensor mounted on one of said platens at each of said sides thereof to move with its platen relative to the other platen and each positioned to be actuated in response to the movement of said platens toward and from each other before clamping engagement and disengagement of the companion gage member, and means connecting said sensors in series with each other and with said control valve and actuating said control valve to arrest the movement of said platens toward each other when both of said sensors are actuated in response to the movement of said platens toward each other whereby when only one of said sensors and its gage member is engaged by the movement of said platens toward each other, said platens fulcrum about said last mentioned gage member until the sensor on the other side of said platens is engaged and actuated at which time said platens are substantially parallel with each other.

References Cited in the file of this patent

UNITED STATES PATENTS

| | | |
|---|---|---|
| 1,497,950 | Smith | June 17, 1924 |
| 1,541,357 | Johnson | June 9, 1925 |
| 2,245,080 | Pendleton | June 10, 1941 |
| 2,536,506 | Kleber | Jan. 2, 1951 |
| 2,561,169 | Bickelhaupt | July 17, 1951 |
| 2,588,066 | Weisberg | Mar. 4, 1952 |
| 2,636,433 | Wennberg | Apr. 28, 1953 |
| 2,805,447 | Voges | Sept. 10, 1957 |
| 2,810,930 | Macdonald et al. | Oct. 29, 1957 |
| 2,882,766 | Towler | Apr. 21, 1959 |
| 2,914,625 | Heveran | Nov. 24, 1959 |
| 2,923,973 | Ninneman | Feb. 9, 1960 |